April 30, 1963    D. M. HEINZE ET AL    3,087,303
JET PROPELLED AIRCRAFT WITH JET DEFLECTING MEANS
Filed March 29, 1960    4 Sheets-Sheet 1

Final or
VTOL Position

Initial or Normal
Cruise Positions

INVENTORS:
Don M. Heinze
Ruediger E. Kosin
Frederick B. Sarsar
Yet L. Yee

By Willard M. Graham
Agent.

United States Patent Office 3,087,303
Patented Apr. 30, 1963

3,087,303
JET PROPELLED AIRCRAFT WITH JET
DEFLECTING MEANS
Don M. Heinze, Los Angeles, Ruediger E. Kosin, Palos
Verdes Estates, Frederick B. Sarsar, Gardena, and Yet
L. Yee, San Pedro, Calif., assignors to Northrop Corporation, Beverly Hills, Calif., a corporation of California
Filed Mar. 29, 1960, Ser. No. 18,354
3 Claims. (Cl. 60—35.55)

This invention relates to aircraft having VTOL/STOL and cruise capabilities at subsonic and supersonic speeds and more particularly to an aircraft having a jet type propulsion engine and a thrust vectoring device adapted to deflect and control the expansion of the engine's exhaust gases in an efficient manner throughout the entire flight spectrum of the aircraft.

Numerous types of aircraft have been proposed embodying features enabling the aircraft to effect VTOL, STOL, and conventional take-off and landing operations and also to effect a transition between a VTOL or STOL operation and conventional flight operations. The capital letters VTOL referes to aircraft having vertical take-off or landing capabilities, and STOL refers to aircraft having short take-off or landing capabilities. To the best of applicants' knowledge all such aircraft designed to provide the above capabilities have been unwieldy, heavy, costly, and inefficient in their operation and, therefore, have left much to be desired.

Accordingly, an object of the present invention is to provide an aircraft embodying a jet type propulsion engine and improved means for deflecting and controlling the expansion of the engine's exhaust gas in an efficient manner throughout all operating ranges of the deflecting means and engine.

Another object is to provide an aircraft embodying a jet type propulsion engine and improved means for deflecting the engine's exhaust gases providing efficient nozzle configurations throughout the entire flight spectrum of the aircraft.

Another object is to provide an aircraft embodying a jet type propulsion engine and improved means for deflecting the engine's exhaust gases; the deflecting means directing the exhaust gases in the horizontal or near horizontal direction while the engine is accelerated to full speed and need only be deflected to the vertical direction momentarily for take-off thus minimizing ground erosion and landing gear heating problems.

Another object is to provide an aircraft embodying a jet type propulsion engine and improved means for deflecting the engine's exhaust gases in a manner providing reverse thrust for braking and landing purposes.

The above and other objects of the present invention are attained by a thrust vectoring device comprising a plurality of juxtaposed and pivotally mounted vanes mounted in the flow path of the exhaust gases from an aircraft's engine. As mounted the vanes may be moved through angular ranges between cruise, STOL, and VTOL positions. In their cruise positions the vanes cooperate to define convergent-divergent nozzles and the engine's exhaust gases are deflected a minimum amount. In other words, at such times as the vanes are in their cruise positions the exhaust gases are directed in a substantially horizontal direction or in a direction generally parallel to the longitudinal axis of the airplane. In their VTOL positions the vanes cooperate to define convergent nozzles and function to deflect the engine's exhaust gases in a near vertical direction or in a direction generally normal to the longitudinal axis of the airplane.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a side view of an aircraft embodying a jet type engine and exhaust gas deflector means of the type disclosed herein.

FIGURES 2, 3, 4, and 5 are diagrammatic views showing the vanes comprising the exhaust gas deflector means of FIGURE 1 in their VTOL or second intermediate positions, cruise or initial positions, STOL or first intermediate positions and reverse or terminal positions, respectively.

Figure 8:
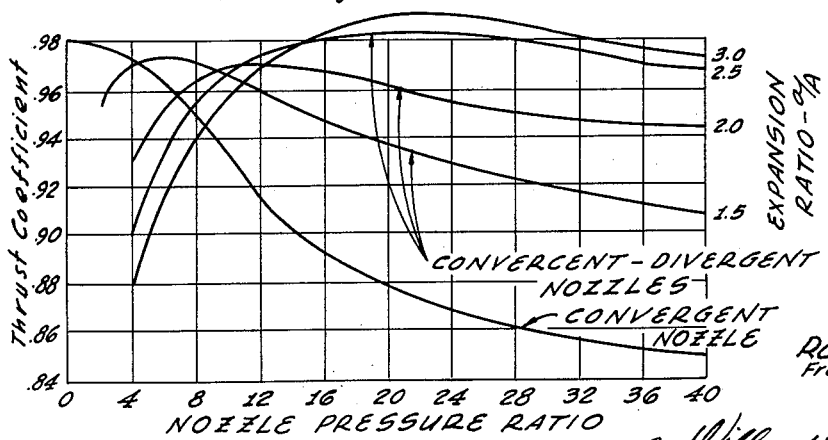

FIGURE 8 graphically shows the efficiency of convergent and convergent-divergent nozzles at various nozzle pressure ratios.

Figure 6:
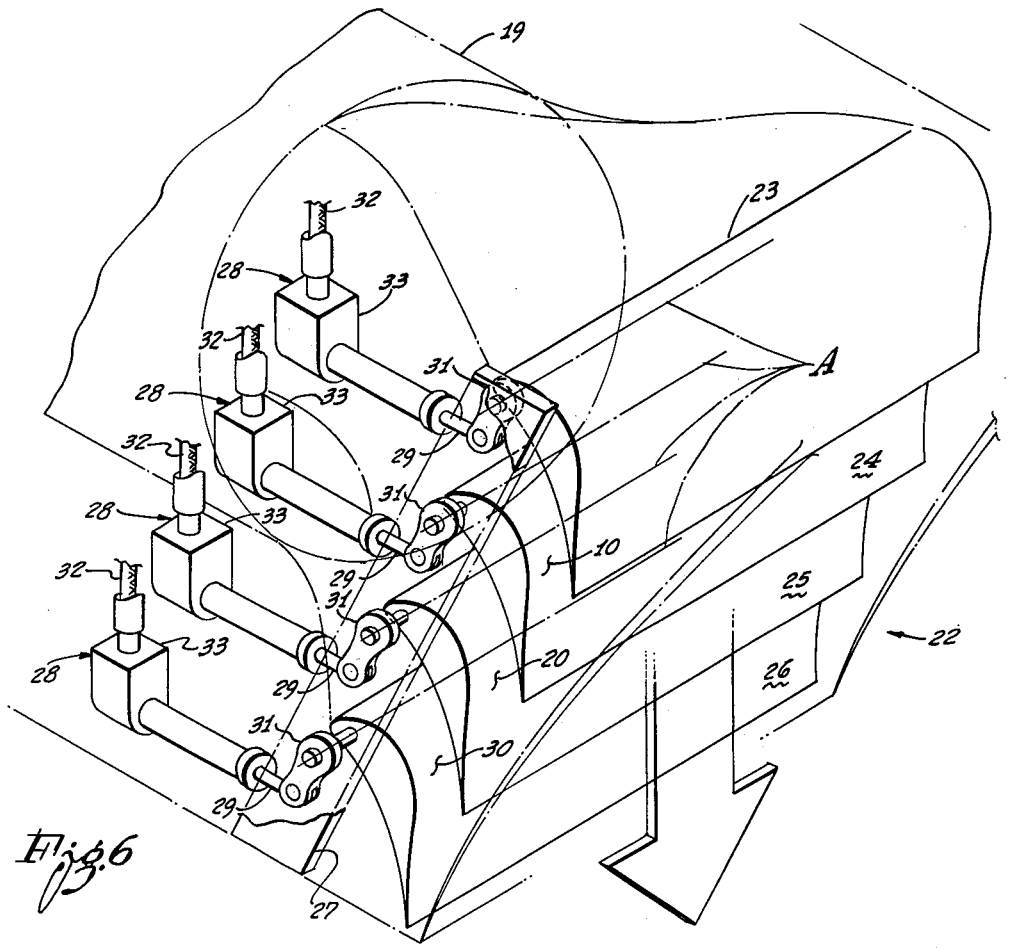
FIGURE 6 is an isometric view on an enlarged scale showing the vanes comprising the exhaust gas deflector means of FIGURE 1 in their VTOL positions.
Figure 9:
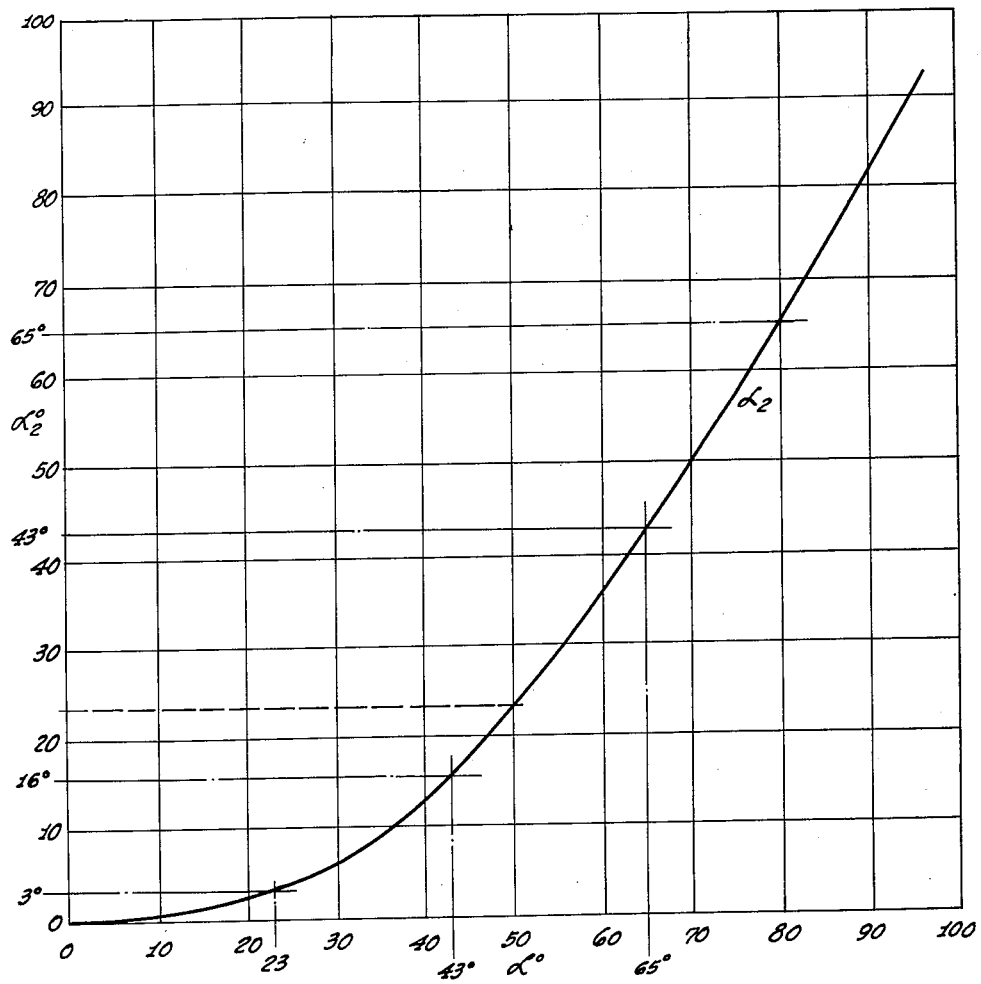

FIGURE 9 graphically shows the movement of one vane of the deflector means shown in FIGURE 6 with respect to other vanes of the deflector.

Figure 1:
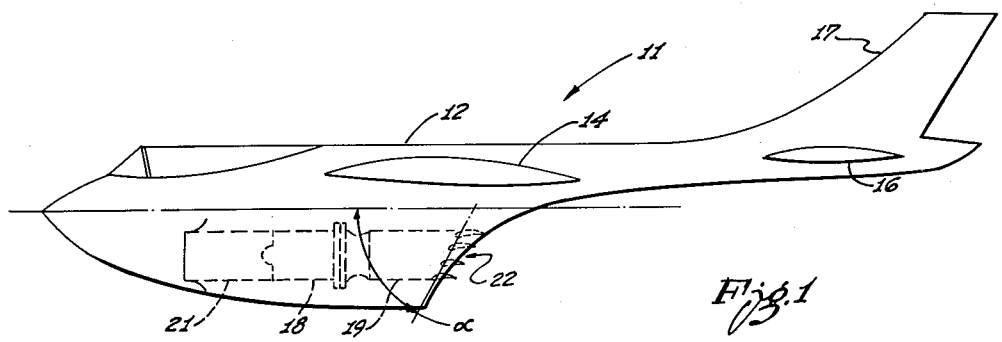

Referring to the drawings, FIGURE 1 shows a jet propelled aircraft 11 having a fuselage 12, wings 14, horizontal tail surfaces 16 and a vertical fin 17. Propulsion for the airplane is provided by a turbine type engine 18 having a tail pipe 19 which exhausts at a location near the longitudinal center of the airplane 11. Air enters the engine 18 through a pair of intake ducts 21 located respectively on each side of the fuselage 12. In the embodiment shown the deflector means 22 is mounted in the tail pipe 19 at a position approximately vertically below the center of gravity of the airplane 11. Although only one deflector means 22 is shown in FIGURE 1, it should be understood that more than one deflector means may be utilized and their locations made compatible with the type of engine, ducting, etc. utilized in the aircraft 11.

Details of the gas deflector means 22 are best seen by referring to FIGURE 6. By referring to this figure it will be seen that the deflector means consists of a plurality of vanes 23–26, inclusive, of streamlined configuration. The vanes are mounted for pivotal movement in rack members 27—27 (only one of which is shown in FIGURE 6) for movement through respective angular ranges as presently explained. Angular movement is imparted to the vanes by individual screw jack assemblies 28 or the like which are actuated by a control system also to be presently described.

Figure 3:
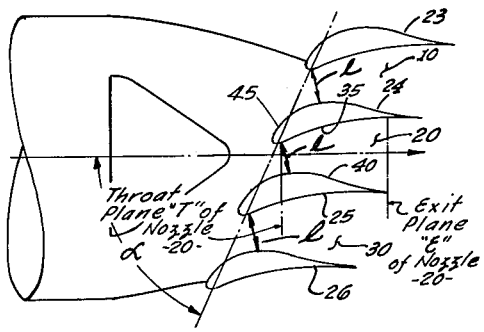

The deflector means 22 is located at the aft end of the tail pipe 19 at which point the tail pipe changes from a circular to a rectangular cross-section. The vanes 23—26 are mounted for pivotal movement about axes, each identified in FIGURE 6 by the letter A, which have a parallel relation and are located aft of the leading edges of the respective vanes. The vanes 23 and 26 are mounted adjacent and have a parallel relation with respect to the top and bottom edges, respectively, of the pipe 19; the blades 24 and 25 are in turn equally spaced between and have a parallel relation with respect to the vanes 23 and 26 to provide three passages or nozzles 10, 20, and 30 for the engine's exhaust gases are best shown in FIGURE 3.

The members 27—27 have an angular relation with respect to the longitudinal axis of the aircraft 11, hereinafter referred to as the rack angle of the deflector means 22. In the embodiment shown the forward angle, i.e. the angle included between the members 27—27 and the longitudinal axis of the aircraft 11 and also between the members 27—27 and the center line of the tail pipe 19, is approximately sixty-five degrees (65°). The angle just referred to is identified in FIGURES 1, 2–4 and 5 by the Greek letter α. The angle α should always be an acute angle for reasons which will become apparent as the disclosure progresses; however, it may vary considerably in accordance with specific design requirements. Accordingly the rack angle of the vanes 23—26, that is, a plane extending through and containing the pivotal axes of the vanes 23—26, will have the same relation with respect to the longitudinal axis of the aircraft as the members 27—27. In this respect a different number of deflector vanes than the number shown in the various figures may be utilized, the only limitations being that the vanes should be positioned and have the same relationship as that described in connection with the vanes 23—26.

The vanes 23—26 are of identical configuration in cross section. Further, it will be seen by referring to FIGURE 3 that the adjacent side surfaces of two adjacent vanes, for example the adjacent side surfaces of the vanes 24 and 25, cooperate to provide a two-dimensional convergent-divergent nozzle, specifically the nozzle 20 as best seen in FIGURE 3. Major portions of the side or gas confining surfaces of the vanes 23—26 are developed by using formulae utilized in developing the blast confining surfaces of a conventional Laval-type nozzle. In this respect the values used in these formulae constitute parameters applicable to a specific aircraft designed to carry out a specific mission. Referring to FIGURE 3, here two planes are shown and are identified by the lines "T" and "E" representing the throat and exit planes, respectively. The lines "T" and "E" have a normal relation with respect to the axis of the nozzle 20.

For purposes of illustration consider the nozzle 20; the contour of the lower surface 35 of the vane 24 is defined, with the exception of the extreme leading edge thereof, by that portion of the contour of a specific Laval nozzle located between the throat and exit planes of the Laval nozzle. The forward edge of the surface 35 terminates in an arcuate surface of small magnitude. The contour of the aft portion of the upper surface 40, i.e. that portion located between the lines "T" and "E," respectively, is identical to the aft portion of the surface 35 and, therefore, identical to the aft portion of the specific Laval nozzle. The forward edge of the surface 40 terminates in an arcuate surface 45 of greater magnitude than the terminal leading edge of the surface 35 and functions to provide the convergent portion of the nozzle 20 when the vanes have a cascade-like arrangement as best seen in FIGURE 3. Additional surfaces, developed as described above, provide the gas confining surfaces of the nozzles 10 and 30 and thus the side surfaces of the vanes 23—26.

The above construction provides vanes of streamlined configuration of a contour substantially as shown in FIGURES 2–5. The greatest profile thickness of one of the vanes 23—26 is approximately 6% of the cord length and this thickness occurs at a position approximately 0.5 of the cord from the leading edge as best seen in FIGURE 3. Also it will be apparent, by referring to FIGURES 2–5, that the upper camber of the vanes 23—26 exceeds the lower camber. This configuration is made possible because the arcuate surface 45 is of greater magnitude than the arcuate surface constituting the leading edge of the surface 35 and provides an airfoil section having blunt and pointed leading and trailing edges respectively. Although a specific contour of the vanes 23—26 has been shown and described, it should be understood that variations and modifications thereof having similar characteristics may be substituted therefor.

Pivotal movement is imparted to the vanes 23—26 by individual conventional screw jack assemblies 28. The output members 29 of the jacks 28 are pivotally connected to the outer bifurcated ends of crank members 31. The inner ends of the crank members are secured to shafts which in turn are fixedly secured to and rotate with the vanes 23—26. The axes of the shaft referred to above coincide with, and in fact constitute the pivotal axes "A" of the vanes 23—26. Rotational movement is imparted to the jacks by means of flexible shafts 32 or the like; this movement is in turn converted into linear movement by suitable gear means 33 comprising an integral part of the jacks 28. Thus it will be seen that pivotal movement in a clockwise or counter clockwise direction is imparted to he vanes 23—26 according to the amount and direction of rotation of the shafts 32.

The gas deflector means 22 enables the aircraft 11 to take off, land, and cruise in a conventional manner, take off and land in a vertical attitude, and also to effect short take-off and landing operations. During normal take-off and landing operations, or during normal cruise operations of the aircraft 11, the vanes are positioned in their cruise or initial positions substantially as shown in FIGURE. In this position the vanes cooperate to define three juxtaposed convergent-divergent nozzles providing three blasts having a cascade-like relation.

The vanes 23—26, when rotated through a predetermined angle in a clockwise direction from their cruise positions, assume their VTOL or second intermediate positions (FIGURE 2) in which the engine's exhaust blast is deflected at an angle of approximately ninety degrees (90°) with respect to the longitudinal axis of the aircraft 11. In the VTOL positions of the vanes it will be seen that the adjacent side surfaces of the vanes cooperate to define convergent nozzles. In other words, the vanes cooperate to define convergent-divergent nozzles in their cruise positions (FIGURE 3) and thereafter as the vanes are rotated in a clockwise direction through the initial portion of their respective angular ranges. As the vanes are rotated further in a clockwise direction, that is through the remainder of their respective angular ranges, they cooperate to define convergent nozzles for a reason which will be explained presently.

Located between the cruise and VTOL positions of the vanes 23—26 is a position referred to as their STOL positions (FIGURE 4) enabling the aircraft 11 to effect short take-off and landing operations. It will be seen by referring to FIGURE 4 that at this time the surfaces of the vanes cooperate to define convergent nozzles and the engine's exhaust gas is deflected downwardly at a suitable angle with respect to the longitudinal axes of the aircraft 11.

Figure 2:
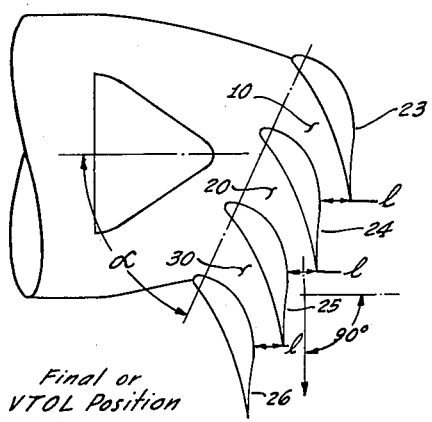
Figure 4:
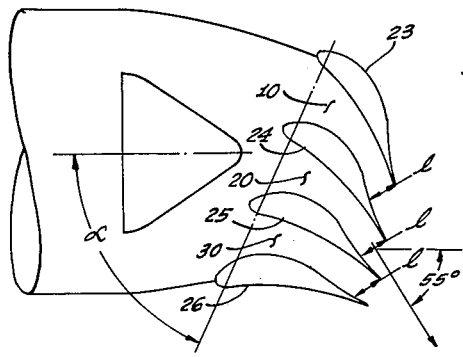

By referring to FIGURES 2–4 it will also be seen that the vanes 23—26, in moving between their cruise and VTOL positions, move through equal arcs. However, by referring to FIGURES 3 and 4 it will be seen that the upper vanes move through greater arcs than the lower vanes in moving from their cruise to their STOL positions or through the initial phase of their angular ranges. For example, the vane 23 in moving from its cruise to its STOL position, is caused to move through a greater arc than the vane 24, the vane 24 through a greater arc than the vane 25, etc. This sequence of movement of the vanes is reversed as they move through the remainder or terminal portion of their angular range. This differential movement of the vanes will be further clarified by referring to FIGURE 9 in which the relative movement of the vanes is graphically illustrated. For example, assume that the vane 23 is moved, from its cruise position (FIGURE 3), in a clockwise direction through an angle of fifty degrees (50°). Concurrently as the above movement is imparted to the vane 23, the vane 24 is caused to move through an angle of approximately 23°, the vane 25 through an angle of approximately 3° while no angular movement is imparted to the vane 26. Referring further to FIGURE 9 it will be seen that at such time as the vane 23 is moved, in a clockwise direction, from its cruise position through an angle of 80°, the vane 24 will have moved through an angle of approximately 65°, the vane 25 through an angle of approximately 43° and the vane 26 through an angle of approximately 16°.

This differential movement of the vanes 23—26, also the rack angle α or cascaded relation of the vanes, combine to maintain the constant throat dimension "1" of the nozzles 10, 20, and 30 and, therefore, constant throat areas of the nozzles.

Figure 7:
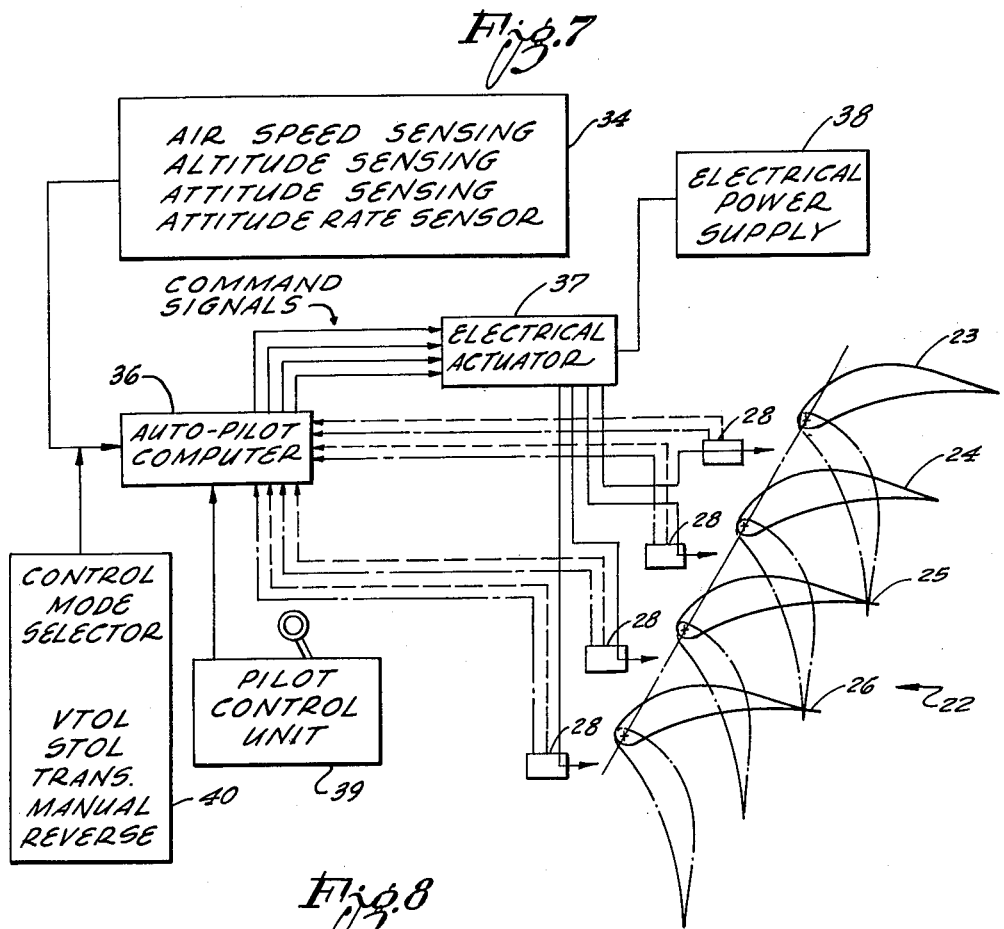
FIGURE 7 is a schematic view showing a control system for controlling and actuating the exhaust gas deflector means as shown in FIGURE 1.

The control means schematically shown in FIGURE 7 comprises means for controlling movement of the respective vanes of the deflector means 22. The means shown in FIGURE 7 constitute conventional components and represent one of several systems which may be utilized to control the aforementioned differential movement to the vanes 23—26. Briefly the system shown includes a device or devices 34 for sensing the air speed, altitude and attitude and the rate of change in the attitude of the aircraft 11. Signals from the device 34 are fed to a summation computer, for example the autopilot computer 36. Command signals from the computer 36 are in turn fed to an electrical actuator 37 and corresponding mechanical movements are transmitted by suitable mechanical linkage, i.e. the screw jack assemblies 28 of FIGURE 6, to the vanes 23—26. Feedback signals, shown by broken line construction in FIGURE 6, are returned to the computer 36 from the jacks 28 indicating the instantaneous positions of the vanes 23—26. Considering the aforementioned differential movement of the vanes 23 and 24, command signals of greater duration are forwarded to the means controlling the movement of the vane 23 than to the means controlling the movement of the vane 24, etc. at such times as the vanes are in the initial portion of their angular ranges. Also, the computer 36 functions to provide signals of greater duration to the means controlling the movement of the vane 24 than the vane 23 etc., during the terminal portion of their angular ranges. Similar differential movements as described above in connection with the vanes 23 and 24 are subsequently imparted to the vane 26 with respect to the vane 25, the vane 25 with respect to the vane 24 and the vane 24 with respect to the vane 23. The above described differential movements are controlled by the computer 36 due to positional signals, shown by dot and dash line construction in FIGURE 6, which are returned from the assemblies 28. These latter signals indicate the location of the vanes in their respective angular ranges and, therefore, function to control the duration of the respective signals which are transmitted to the actuator 37 for controlling the individual movements of the vanes 23—26. Upon proper movement of the vanes 23—26 the feedback signals cancel the command signals and no further command signals are transmitted to the actuator 37 and further movements of the vanes 23—26 are precluded until different signals are again fed to the computer 36 or the air speed, altitude, attitude, etc. of the aircraft 11 changes. Power for the actuator 37 is provided by an electrical power source 38.

The sensing device 34 and signals received therefrom are referred to as an automatic control system, however, signals from the sensing means 34 may be over-ridden by a pilot actuated control unit 39 or by a semiautomatic mode selector 41. By utilizing the selector 41 the vanes 23—26 may be positioned in their VTOL, STOL, cruise positions, etc. automatically. The selector 41 may constitute conventional playback equipment of any type desired.

The exhaust pressure ratio $(P/P_0)$ of a conventional jet engine increases according to flight speed from approximately two (2) at static sea level to approximately five (5) at maximum sea level speeds; these conditions require a convergent nozzle for the most efficient operation at sea level. For supersonic speeds at high altitudes, however, nozzle pressure ratio increases to between twenty (20) and forty (40), these conditions requiring convergent-divergent nozzles having high expansion ratios. This condition is graphically illustrated and will be clarified by referring to FIGURE 8. By referring to FIGURE 8 it will be seen that a convergent nozzle utilizes approximately ninety-eight percent (98%) of a jet engine's thrust while convergent-divergent nozzles are far less effective. Further it will be seen that as the nozzle pressure ratio reaches and exceeds five (5) a convergent-divergent nozzle, that is a convergent-divergent nozzle having the proper expansion ratio, will utilize approximately ninety-eight percent (98%) of engine thrust while a convergent nozzle will not. Therefore, it is apparent that a convergent-divergent nozzle will be more efficient and should be utilized at nozzle pressure ratios of five (5) or greater.

Figure 5:
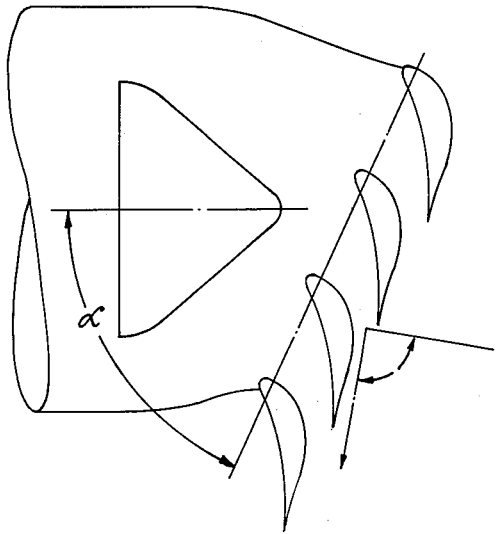

The vanes 23—26 also have terminal or reverse positions as shown in FIGURE 5. In these positions the vanes function to deflect the engine's blast in a reverse direction with respect to the forward progress of the aircraft 11. Further explanation of the over-travel or thrust reversing positions of the vanes 23—26 is not believed necessary in view of the foregoing explanation, particularly in view of the explanation in connection with FIGURES 2, 3, and 4. However, in the over-travel positions of the vanes 23—26 it will be apparent that the engine's exhaust gases are utilized to retard the forward progress of the aircraft and also enables it to move rearwardly under conditions in which pin point landing is required.

Any suitable type of conventional reaction devices may be utilized to maintain the stability of the aircraft 11 during VTOL operations. Such devices are well known and may be located adjacent the nose and tail of the aircraft and on each of the wings 14.

While, in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A deflector assembly adapted to deflect the exhaust gases from a jet engine or the like comprising: elongated duct means adapted to have a gas at super-atmospheric pressure transmitted therethrough; said duct means having fore and aft open ends providing means for the ingress and egress, respectively, of said gas at super-atmospheric pressure and an axis extending generally parallel to the longitudinal extent thereof; a plurality of elongated streamlined vanes mounted at the aft end of said duct means as a cascade in horizontal and vertical spaced relation; said vanes being pivotally mounted for angular movement between initial and second intermediate positions in which the top surfaces of said vanes cooperate solely with adjacent bottom surfaces of said vanes to define convergent-divergent and convergent nozzles, respectively; and power means adapted to simultaneously impart differential angular movement to said vanes in the same direction insuring that said adjacent side surfaces of said vanes cooperate to define convergent nozzles in substantially all positions between said initial and second intermediate positions.

2. The deflector assembly as set forth in claim 1: in which the leading edges of said vanes are rounded, the trailing edges tapered, the upper surfaces have a convex configuration, the lower surfaces have a concave configuration and the maximum thickness thereof being located approximately halfway between the leading and trailing edges.

3. A deflector assembly adapted to deflect the exhaust gases from a jet engine or the like comprising: elongated duct means adapted to convey a gas at super-atmospheric pressure; said duct means having fore and aft open ends providing means for the ingress and egress, respectively, of said gas at superatmospheric pressure and an axis extending generally parallel to the longitudinal extent thereof; a support structure including a plurality of streamlined vanes mounted at the aft end of said duct means; said vanes being pivotally mounted in said support structure as a cascade in horizontal and vertical spaced relation; said vanes having rounded leading edges, tapered trailing edges, convex upper surfaces, concave lower surfaces and the maximum thickness thereof being located approximately halfway between the leading and trailing edges; said vanes being angular movable between initial positions in which the upper surfaces of said vanes cooperate solely with adjacent lower of said vanes to define convergent-divergent nozzles functioning to deflect gases exhausting from said duct means in a direction parallel to the axis of said duct means and second intermediate positions in which said adjacent side surfaces of said vanes cooperate solely to define convergent nozzles functioning to deflect gases exhausting from said duct means in a direction normal to the axis of said duct means; and power means adapted to simultaneously impart differential angular movement in the same direction to said vanes insuring that said adjacent side surfaces of said vanes function to define convergent nozzles in substantially all positions between said initial and second intermediate positions.

References Cited in the file of this patent
UNITED STATES PATENTS

| | | |
|---|---|---|
| 2,799,989 | Kappus | July 23, 1957 |
| 2,918,232 | Lippisch | Dec. 22, 1959 |
| 2,973,921 | Price | Mar. 7, 1961 |

FOREIGN PATENTS

| | | |
|---|---|---|
| 1,208,491 | France | Sept. 14, 1959 |
| 764,180 | Great Britain | Dec. 19, 1956 |